United States Patent
Chang

(10) Patent No.: US 6,465,991 B1
(45) Date of Patent: Oct. 15, 2002

(54) SWITCHABLE POWER CONVERTER WITH COUPLED INDUCTOR BOOST AND COUPLED INDUCTOR SEPIC FOR MULTIPLE LEVEL INPUT LINE POWER FACTOR CORRECTION

(75) Inventor: Chin Chang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/918,195

(22) Filed: Jul. 30, 2001

(51) Int. Cl.$^7$ ................................................. G05F 1/10
(52) U.S. Cl. ...................................................... 323/222
(58) Field of Search ................................. 323/222, 223, 323/226; 363/16, 95, 97, 131

(56) References Cited

U.S. PATENT DOCUMENTS

| | | |
|---|---|---|
| 5,019,952 A | 5/1991 | Smolenski et al. |
| 5,434,767 A | 7/1995 | Batarseh et al. |
| 5,446,366 A * | 8/1995 | Bassett et al. ............... 323/222 |
| 5,636,106 A | 6/1997 | Batarseh et al. |
| 5,642,267 A | 6/1997 | Brkovic et al. |
| 5,793,190 A * | 8/1998 | Sahlstrom et al. ........... 323/222 |
| 5,923,152 A * | 7/1999 | Guerrera ....................... 323/222 |
| 6,166,527 A * | 12/2000 | Dwelley et al. ............. 323/222 |

FOREIGN PATENT DOCUMENTS

EP  492820 A2  7/1992

* cited by examiner

Primary Examiner—Matthew Nguyen

(57) ABSTRACT

A switchable power converter includes an input section that receives an AC input voltage and rectifies the AC input voltage and a switchable converter section operative to receive the rectified AC input voltage and convert the rectified AC input voltage to an intermediate DC output voltage. The switchable converter section includes at least one configuration switch operative to switch the switchable converter section between a boost converter topology, for low input line voltages, and a SEPIC converter circuit topology, for high input line voltages, and also includes a coupled inductor. The coupled inductor eliminates an open-ended terminal in a load inductor thereby reducing antenna effect. Additionally, the coupled inductor achieves a current ripple steering effect in the boost converter topology, similar to that of the SEPIC converter topology, resulting in a smaller input current ripple requiring a smaller EMI filter.

23 Claims, 3 Drawing Sheets

SWITCHABLE POWER CONVERTER WITH COUPLED INDUCTOR BOOST AND COUPLED INDUCTOR SEPIC FOR MULTIPLE LEVEL INPUT LINE POWER FACTOR CORRECTION

BACKGROUND OF THE INVENTION

1. Field of the Invention

The present invention relates generally to power converters, and more particularly to switchable power converters for multiple level input line power factor correction.

2. Background of the Invention

FIG. 1 illustrates a conventional power converter circuit operating as a high frequency electronic ballast for multiple gas discharge lamps 190. Referring to FIG. 1, the power converter circuit basically comprises two stages. The front end is a boost converter 100 for universal line power factor correction and universal line voltage regulation. The boost converter 100 is primarily comprised of power switch 102, inductor 104, diode 106, DC bus capacitor 108 and power factor correction (PFC) control integrated circuit (IC) 109.

The back end is a typical voltage-fed half-bridge inverter 140 loaded with the lamps 190 through a resonant tank circuit comprised of a capacitor 152 and inductor 154, along with the magnetizing inductance associated with output transformer 156. The half-bridge inverter is primarily comprised of power switches 148 and 150 which are controlled by a high voltage control integrated circuit (IC) 151, as known in the art.

The boost converter of FIG. 1 is ideal for providing a DC bus voltage 112 of 450 VDC output across capacitor 108 for input voltages of 120V/277V AC at Vin. The relatively high DC output voltage level is because the intrinsic topology of the boost converter causes the DC bus voltage 112 to be greater than the peak value of the input line voltage.

However, some applications require a lower DC bus voltage, for example 225V DC. In those applications a flyback converter is better suited, since the flyback converter is capable of generating the relatively low DC bus voltage of 225V DC from an input voltage of 120V/277VAC. The flyback converter, however, has several drawbacks, including higher component stresses, lower overall efficiency, larger component sizes, and severely large electromagnetic interference (EMI) conditions.

Alternatively, a single-ended primary inductance converter (SEPIC) may be employed. The SEPIC is capable of producing an intermediate DC output voltage, such as 225V DC. While the SEPIC shares some of the drawbacks of the flyback converter, such as higher component stress, lower overall efficiency and a resulting larger size due to additional DC blocking capacitors, the SEPIC enjoys improved EMI conditions. This is because the SEPIC input section is similar in configuration to the boost converter input section.

It is a characteristic of both the flyback and SEPIC converters that the highest losses occur at the lowest input line voltage and the highest voltage stresses occur at the highest input line voltage over a universal input line voltage range. Among the flyback, SEPIC and boost converters, the boost converter exhibits the highest efficiency and lowest voltage stresses. However, as discussed above, the boost converter is only viable for use at lower input line voltages in the case of 225V DC output bus voltage specifications.

To overcome the above stated disadvantages, a switchable power converter was disclosed in U.S. patent application Ser. No. 09/716,698, entitled "SWITCHABLE POWER CONVERTER FOR MULTIPLE LEVEL INPUT LINE POWER FACTOR CORRECTION" for Chin Chang, Adan Hernandez and Gert Bruning, filed on Nov. 20, 2000, now U.S. Pat. No. 6,373,725; the contents of which are hereby incorporated by reference. The application discloses a switchable power converter that advantageously switches between a boost converter circuit topology, for low input line voltages, and either a flyback or SEPIC converter circuit topology, for high input line voltages, to provide an intermediate DC output voltage level, such as 225V DC, over a range of input line voltage levels. However, depending on the switch position, certain configurations may result in an open-ended terminal of an inductor, which may create EMI conditions due to antenna effect. Additionally, the boost converter topology results in a large input current ripple requiring a large EMI filter.

Therefore, a further switchable power converter is needed that advantageously switches between a boost converter circuit topology, for low input line voltages, and a SEPIC converter circuit topology, for high input line voltages, that reduces the antenna effect of the circuit and provides a current steering ripple effect in both the booster and SEPIC converter circuit topologies.

SUMMARY OF THE INVENTION

It is therefore an object of the present invention to provide a switchable power converter including a coupled inductor and a configuration switch arranged to prevent an open-ended terminal of the coupled inductor in any state of the configuration switch.

It is another object of the present invention to provide a switchable power converter having improved efficiency and reduced stresses over a range of input line voltages.

It is a further object of the present invention to provide a switchable power converter having a reduced antenna effect for improved EMI conditions in either of the switchable configurations.

It is a further object of the present invention to provide a switchable power converter having a current ripple steering effect for improved EMI conditions in either of the switchable configurations.

To achieve the above objects, a switchable power converter in accordance with the present invention includes an input section that receives an AC input voltage- and rectifies the AC input voltage and a switchable converter section operative to receive the rectified AC input voltage and convert the rectified AC input voltage to an intermediate DC output voltage. The switchable converter section includes at least one configuration switch operative to switch the switchable converter section between a boost converter topology, for low input line voltages, and a SEPIC converter circuit topology, for high input line voltages, and also includes a coupled inductor. The configuration switch eliminates the open-ended terminal in a load inductor of the coupled inductor thereby reducing any antenna effect. Additionally, the coupled inductor achieves a current ripple steering effect in the boost converter topology, similar to that of the SEPIC converter topology, resulting in a smaller input current ripple requiring a smaller EMI filter. The configuration switch may be a relay based mechanical switch or a solid state switch, for example.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention with unnecessary detail.

Figure 1:
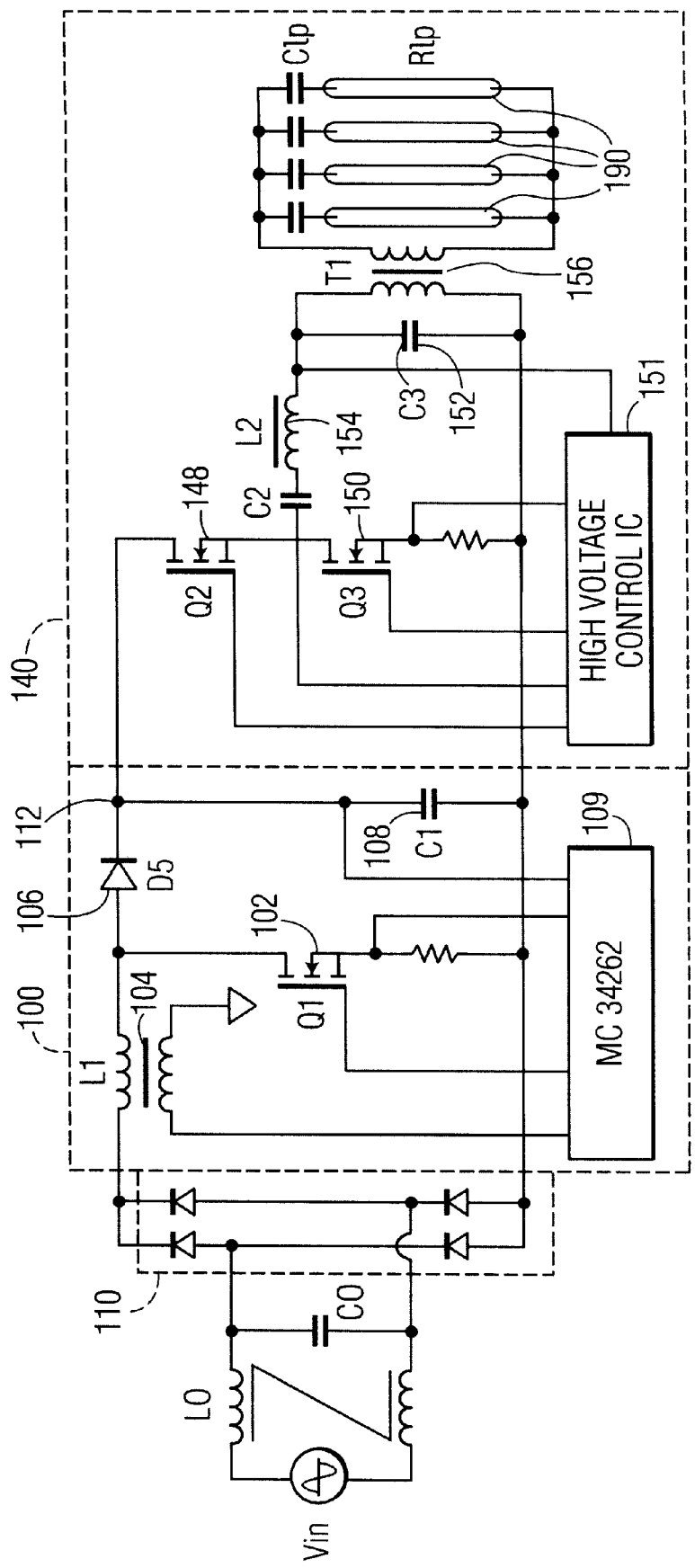
FIG. 1 is a schematic diagram illustrating a conventional boost converter application.
Figure 2:
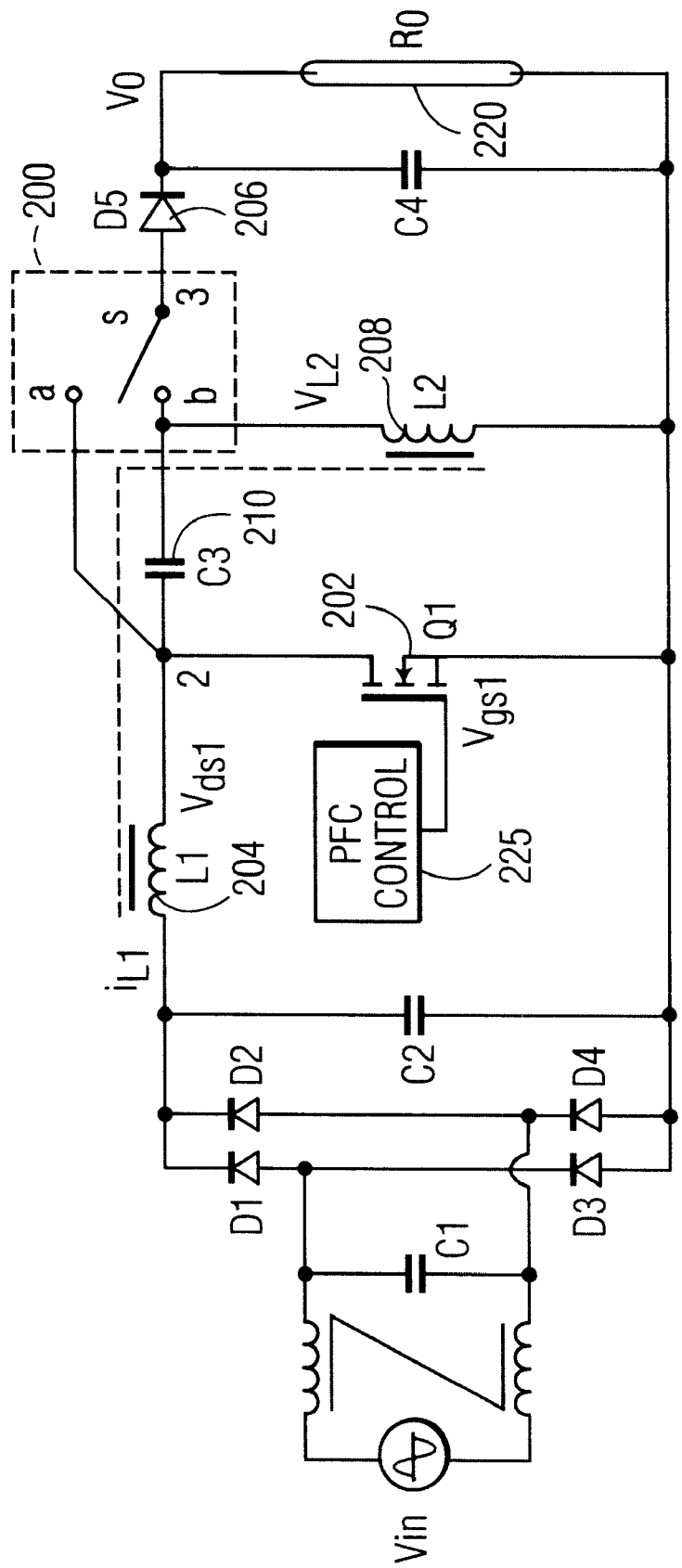
FIG. 2 is a schematic diagram illustrating a switchable coupled inductor boost/SEPIC power converter in accordance with the present invention.
Figure 3:
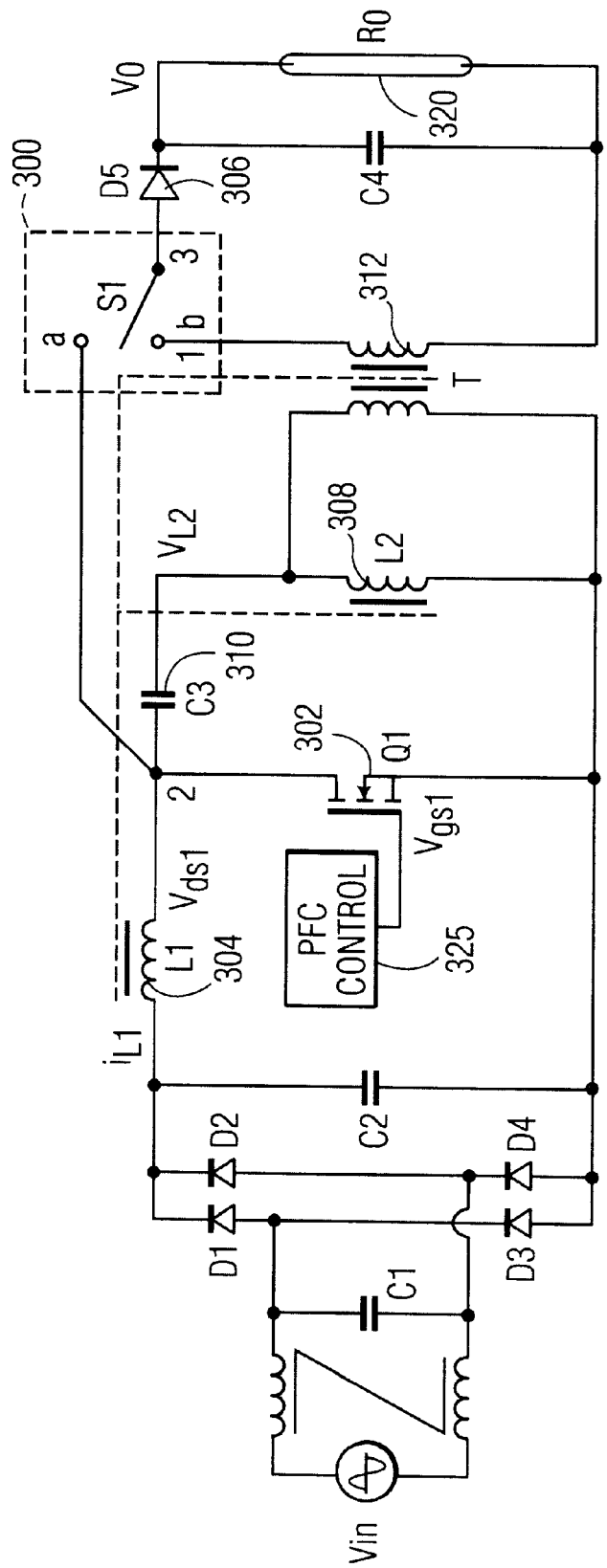
FIG. 3 is a schematic diagram illustrating a switchable coupled inductor boost/isolated SEPIC power converter in accordance with the present invention.

Turning again to the drawings, in which like reference numerals identify similar or identical elements throughout the several views, FIG. 2 illustrates an exemplary circuit topology for a switchable coupled inductor boost/SEPIC converter in accordance with the present invention. FIG. 3 illustrates a second embodiment of the switchable coupled inductor boost/SEPIC converter providing isolation of a load when in the SEPIC configuration.

Referring to FIG. 2, when a switch 200 is conductive (closed) in position a, the switchable coupled inductor boost/SEPIC converter is configured as a boost converter topology. In this configuration, the boost converter is comprised primarily of power switch 202, coupled inductors 204 and 208, capacitor 210 and diode 206. When switch 200 is conductive in position b, a coupled inductor SEPIC converter topology is formed comprised primarily of power switch 202 (controlled by power factor correction (PFC) control 225), coupled inductors 204 and 208, capacitor 210 and diode 206. In both configurations, inductor 208 is terminated on one end to a power bus of the converter and on the other end to the return path of the converter, thus eliminating an open-ended terminal.

Referring to FIG. 3, a second embodiment of a switchable coupled inductor boost/isolated SEPIC converter according to the present invention is shown. Here, when switch 300 is conductive (closed) in position a, a coupled inductor boost converter topology is formed comprised primarily of power switch 302, coupled inductors 304 and 308, capacitor 310 and diode 306. When switch 300 is conductive in position b, a coupled inductor isolated SEPIC converter topology is formed comprised primarily of power switch 302, inductors 304 and 308 coupled together and also coupled to isolation transformer 312, capacitor 310, and diode 306. Here, inductor 308 may be omitted because the magnetizing inductance of the isolation transformer 312 will perform the same coupling with inductor 304. As can be appreciated, the circuits of FIGS. 2 and 3 are similar, with the circuit of FIG. 3 providing isolation of the load 320 in the SEPIC configuration via isolation transformer 312.

As discussed above, it is advantageous to configure the circuits of FIGS. 2 and 3 to operate in a coupled inductor boost topology when the input line voltage is approximately 120V AC, since the coupled inductor boost converter provides greater circuit efficiency. Thus, in this case, switch 200, 300 is closed in position a. However, due to the intrinsic output voltage limitations of the boost converter, a coupled inductor SEPIC converter topology is preferable when the input voltage is approximately 277V AC, in order to obtain a medium output voltage that is lower than the peak input voltage, such as 225V DC. Thus, in this case, switch 200, 300 is closed in position b.

There are notable practical circuit design considerations when implementing a switchable power converter including the switchable boost/SEPIC of FIGS. 2 and 3. First, the power factor correction (PFC) control 225, 325 must be capable of achieving power factor correction for both the coupled inductor boost and coupled inductor SEPIC topologies. The PFC control IC preferably operates each type of converter in the critical conduction mode. The critical conduction mode is at the boundary between the continuous conduction mode and the discontinuous conduction mode. The operating frequency may vary over each input line voltage cycle. The power switch 202, 302 is switched at the instant the drain-source voltage waveform passes through zero (ZVS condition), thereby reducing switching loss and minimizing RF interference. One example of a suitable PFC control IC is the Motorolla MC34262 (equivalently L6561D).

Another design factor is the value of the coupled inductors 204/208, 304/308, which are used in both the boost and SEPIC converter topologies. The coupled inductors 204/208, 304/308 must be selected to properly center the circuit operating frequency. The ideal inductance value $L_b$ (corresponding to each of coupled inductors 204/208 and 304/308) for the boost converter operated at critical conduction mode is calculated using Equation 1 below:

$$L_b = \frac{V_{inLL}^2(V_0 - \sqrt{2} \cdot V_{inLL})}{2f_b P_0 V_0} \qquad \text{Equation 1}$$

where: $V_{inLL}$ is the low line input voltage
$V_o$ is the DC output voltage
$P_o$ is the output power
$f_b$ is the switching frequency of the power switch.

The ideal inductance value $L_s$ (for coupled inductors 204/208, and coupled inductors 304/308) for the SEPIC converter operated at critical conduction mode is calculated using Equation 2 below:

$$L_s = \frac{(NV_0)^2}{P_0 f_s}\left[\frac{\sqrt{2} \cdot V_{inHL}}{NV_0 + \sqrt{2} \cdot V_{inHL}}\right]^2 \qquad \text{Equation 2}$$

where: $V_{inHL}$ is the high line input voltage
$V_o$ is the DC output voltage
N is the isolation transformer 312 turns ration (N=1 for non-isolated Circuit of FIG. 2)
$f_s$ is the switching frequency of the power switch.

Therefore, since the inductance value is the same in the switchable boost/SEPIC circuit (i.e. $L_b=L_s$), the switching frequency ratio $f_b/f_s$ is calculated by combining Equations 1 and 2 as shown in Equation 3 below:

$$\frac{f_b}{f_s} = \frac{V_{inLL}^2(V_0 - \sqrt{2} \cdot V_{inLL})(NV_0 + \sqrt{2} \cdot V_{inHL})^2}{4(NV_0)^2 V_{inHL}^2 V_0} \qquad \text{Equation 3}$$

From Equation 3 it can be appreciated that for the appropriate values of $V_o$, N, $V_{inLL}$, and $V_{inHL}$, the ratio $f_b/f_s$ will optimally approach 1. By having the ratio $f_b/f_s$ approach 1, a power switch with a limited switching frequency range can be employed. It therefore follows that an ideal switching frequency range of power switch 202, 302 may be implemented to accommodate both the coupled inductor boost and coupled inductor SEPIC circuit topologies.

In addition, the switching of switch 200, 300 between the coupled inductor boost and coupled inductor SEPIC topologies will depend on the input line voltage level. That is, for low line input voltages, such as 120VAC, the switch 200 will be conductive in position a to configure the converter as a coupled inductor boost converter circuit topology. Alternatively, for high line input voltages, such as 277VAC, the switch will be conductive in position b to configure the converter as a coupled inductor SEPIC circuit topology. Similarly, for the switchable coupled inductor boost/isolated SEPIC converter of FIG. 3, switch 300 will be conductive in position a at low line input voltages to form a boost converter topology, and will be conductive in position b for high line input voltages to form an isolated SEPIC topology.

An ordinarily skilled artisan will recognize there are many different ways to implement the topology switching function described above. In a simple implementation, factory installed jumpers are used to connect switch 200, 300 to either terminal a or b, depending on a user's needs. Slightly more complicated implementations involving automatic switching schemes may also be employed. For example, an input voltage sensing circuit which controls a relay or solid state switch according to the input line voltage may be employed as switch 200, 300. Additionally, various methods can be employed to adjust the switching of PFC control IC 225, 325 depending on the position of the switch 200, 300, e.g., programmed in the factory or processor-based on the position of a solid state switch.

Another exemplary implementation utilizes the circuit switching frequency information. In this implementation, the circuit is again initially configured as a coupled inductor SEPIC (or isolated SEPIC) converter. The switching frequency of switch 202, 302 of the converter will vary with the input line voltage level. That is, when the input line voltage is high the switching frequency is higher than it is for low line input voltages. Accordingly, when the lower switching frequency is detected, control signals are initiated to change the state of a solid state relay or switch 200, 300, which thereby changes the configuration of the converter to a coupled inductor boost converter.

Accordingly, by using a switchable power converter, the most efficient power converter circuit for wide input and/or output range applications is realized. By using the best characteristics of each converter type and combining them in a suitable configuration, circuit efficiency is greatly improved over the single topology circuits, such as the flyback and SEPIC converter. Additionally, by employing a coupled inductor, the switchable power converter will realize improved EMI conditions due to the reduced antenna effect and current ripple steering effect.

An ordinarily skilled artisan will recognize that the present invention also encompasses many variations to the exemplary embodiments detailed above. For example, the switching functions of the present invention may be realized using resources shared with, for instance, the power stage components and/or control circuitry to thereby minimize cost and increase compactness. In addition, while the switching actions and number of switches are limited in the exemplary embodiments detailed above, the present invention may include any number of switches/switching actions. Any number of components may be added or removed from the circuit topology in accordance with the switches/switching actions.

In addition, the converter section may be operated using various conduction modes and is not limited to only critical conduction mode. For example, the converter section may also operate in continuous conduction mode, discontinuous conduction mode, and/or any combination of the three modes.

Further, while the exemplary embodiments described above illustratively utilize low line and high line input voltages of 120V/277V AC, respectively, to produce an intermediate DC output voltage of 225V, the circuit components, circuit topology and switching frequency characteristics may be selected as needed to accompany other operating voltages, such as 120V/240V AC input voltages.

While the present invention has been described in detail with reference to the preferred embodiments, they represent mere exemplary applications. Thus, it is to be clearly understood that many variations can be made by anyone having ordinary skill in the art while staying within the scope and spirit of the present invention as defined by the appended claims.

What is claimed is:

1. A switchable power converter, comprising:

an input section that receives an AC (alternating current) input voltage and rectifies the AC input voltage; and a switchable converter section operative to receive the rectified AC input voltage and convert the rectified AC input voltage to an intermediate DC output voltage;

said switchable converter section including at least one configuration switch operative to switch the switchable converter section between a boost converter topology and a SEPIC (single-ended primary inductance converter) topology according to a voltage level of the AC input voltage and including a coupled inductor.

2. The switchable power converter of claim 1, wherein the switchable converter section comprises:

a power bus including a first inductor of said coupled inductor and a capacitor connected in series, said power bus receiving the rectified AC input voltage via the first inductor and outputting the intermediate DC output voltage via a diode coupled to said power bus by the at least one configuration switch;

a power switch connected between a return path and a junction between the capacitor and the first inductor;

a second inductor of said coupled inductor, magnetically coupled with the first inductor, connected between the return path and a first terminal of the at least one configuration switch, said first terminal electrically connected to a junction between the second inductor and the capacitor;

a second terminal of the at least one configuration switch electrically connected to the junction between the capacitor and first inductor;

a third terminal of the at least one configuration switch connected to said diode; and a power switch control circuit to control a power switching of the power switch in accordance with the voltage level of the AC input voltage; thereby maintaining the intermediate DC output voltage;

wherein when the at least one configuration switch is conductive only between the first and third terminals, the switchable converter is operative using the SEPIC converter topology and when the configuration switch is conductive only between the second and third terminals, the switchable converter section is operative using the boost topology.

3. The switchable power converter of claim 1, wherein the switchable converter section comprises:

a power bus including a first inductor of said coupled inductor and a capacitor connected in series, said power bus receiving the rectified AC input voltage via the first inductor and outputting the intermediate DC output voltage via a diode coupled to said power bus by the at least one configuration switch;

a power switch connected between a return path and a junction between the capacitor and the first inductor;

a second inductor of said coupled inductor, magnetically coupled with the first inductor, connected between the return path and the capacitor;

a transformer having a primary coil connected in parallel to the second inductor and a secondary coil having a first end connected to the return path and a second end connected to a first terminal of the at least one configuration switch;

a second terminal of the at least one configuration switch electrically connected to the junction between the capacitor and first inductor;

a third terminal of the at least one configuration switch connected to said diode; and a power switch control circuit to control a power switching of the power switch in accordance with the voltage level of the AC input voltage; thereby maintaining the intermediate DC output voltage;

wherein when the at least one configuration switch is conductive only between the first and third terminals, the switchable converter is operative using the SEPIC converter topology and when the configuration switch is conductive only between the second and third terminals, the switchable converter section is operative using the boost topology.

4. The switchable power converter of claim 1, wherein when the AC input voltage level is approximately 120VAC, the at least one configuration switch is operative to switch the switchable converter section to a boost converter topology and when the AC input voltage is approximately 277VAC, the at least one configuration switch is operative to switch the switchable converter section to a SEPIC topology.

5. The switchable power converter of claim 1, wherein when the AC input voltage level is approximately 120VAC, the at least one configuration switch is operative to switch the switchable converter section to a boost converter topology and when the AC input voltage is approximately 240VAC, the at least one configuration switch is operative to switch the switchable converter section to a SEPIC topology.

6. The switchable power converter of claim 1, wherein a total inductance value $L_b$ of first and second inductors comprising the coupled inductor, the second inductor being coupled to the first, is substantially as follows when the configuration switch is switched to the boost converter topology:

$$L_b = \frac{V_{inLL}^2 (V_0 - \sqrt{2} \cdot V_{inLL})}{2 f_b P_0 V_0}$$

where: $V_{inLL}$ is a low line AC input voltage,
$V_o$ is the DC output voltage,
$P_o$ is an output power, and
$f_b$ is a switching frequency of the switchable power converter.

7. The switchable power converter of claim 1, wherein a total inductance value $L_s$ of first and second inductors comprising the coupled inductor, the second inductor being coupled to the first, is substantially as follows when the configuration switch is switched to the SEPIC topology:

$$L_s = \frac{(NV_0)^2}{P_0 f_s} \left[ \frac{\sqrt{2} \cdot V_{inHL}}{NV_0 + \sqrt{2} \cdot V_{inHL}} \right]^2$$

where: $V_{inHL}$ is a high line AC input voltage,
$V_o$ is the DC output voltage,
N is a turns ratio for the transformer, and
$f_s$ is a switching frequency of the switchable power converter.

8. The switchable power converter of claim 1, wherein the at least one configuration switch is comprised of continuity jumpers.

9. The switchable power converter of claim 1, wherein the at least one configuration switch is comprised of an input voltage sensing circuit and an electrically controlled switch, said input voltage sensing circuit sensing a voltage level of the AC input voltage and controlling the electrically controlled switch according to said voltage level.

10. The switchable power converter of claim 1, wherein the at least one configuration switch is comprised of a switching frequency sensing circuit, and an electrically controlled switch, said switching frequency sensing circuit sensing a switching frequency of the switchable power converter and controlling the electrically controlled switch according to said switching frequency, the switching frequency varying according to the AC input voltage.

11. A switchable power converter, comprising:
an input section that receives an AC input voltage and rectifies the AC input voltage; and
a switchable converter section operative to receive the rectified AC input voltage and convert the rectified AC input voltage to an intermediate DC output voltage;
said switchable converter section including a coupled inductor and at least one configuration switch operative to switch the switchable converter section between a boost converter topology and a SEPIC topology according to a voltage level of the AC input voltage, and in a manner such that the coupled inductor has no open-ended terminal in either state of the one configuration switch.

12. The switchable power converter as claimed in claim 11 wherein the coupled inductor comprises first and second magnetically coupled inductors and the one configuration switch comprises first, second and third effective terminals, and the switchable converter section comprises;

first means coupling said first inductor, a capacitor and the second inductor in series to first and second output terminals of the input section,
a diode coupled between the third terminal of the at least one configuration switch and a first load output terminal,
a second load output terminal coupled to the second output terminal of the input section,
a transistor switch coupled to a junction between the first inductor and the capacitor and to the second output terminal of the input section,
second means coupling the first terminal of the configuration switch to the second inductor,
third means coupling the second terminal of the configuration switch to the junction point between the first inductor and the capacitor, and
a control circuit for switching the transistor switch on and off at a high frequency.

13. The switchable power converter as claimed in claim 11 wherein the coupled inductor comprises first and second magnetically coupled inductors and the one configuration switch has first and second states, wherein the switchable converter section comprises;

said first and second magnetically coupled inductors, a capacitor, a diode and a transistor switch, and in the first and second states of the one configuration switch the switchable converter section is configured in the SEPIC topology and in the boost converter topology, respectively, and the first and second magnetically coupled inductors of the coupled inductor are both electrically operative in both the boost converter and SEPIC converter topologies.

14. The switchable power converter as claimed in claim 11 wherein, for low level input AC voltages the one configuration switch switches the switchable converter section into the boost converter topology, and for high level input AC voltages the one configuration switch switches the switchable converter section into the SEPIC converter topology.

15. The switchable power converter as claimed in claim 13 further comprising:

a control circuit for switching the transistor switch on and off at a high frequency, and a transformer having a primary coil coupled in parallel with the second inductor and a secondary coil coupled to a terminal of the one configuration switch and to an output terminal for connection to a load.

16. A switchable power converter, comprising:

an input section that receives an AC input voltage and rectifies the AC input voltage to provide a rectified output voltage at first and second output terminals of the input section, and a switchable converter section coupled to said first and second output terminals and operative to convert the rectified output voltage into an intermediate DC output voltage, said switchable converter section including a configuration switch operative to switch the switchable converter section between a boost converter topology and a SEPIC topology according to a voltage level of the AC input voltage, and a coupled inductor including first and second magnetically coupled inductors each electrically operative in both the boost converter and SEPIC converter topologies.

17. The switchable power converter as claimed in claim 16 wherein, when the configuration switch switches the switchable converter section into the boost converter topology, the second inductor is electrically coupled in series circuit with the first inductor and a capacitor to the first and second output terminals of the input section.

18. The switchable power converter as claimed in claim 16 wherein the configuration switch has first and second states corresponding to the SEPIC and boost converter topologies, respectively, and in either state of the configuration switch the second inductor is electrically coupled to the first and second output terminals of the input section.

19. The switchable power converter as claimed in claim 16 wherein the configuration switch has first and second states corresponding to the SEPIC and boost converter topologies, respectively, and in either state of the configuration switch the second inductor is electrically coupled to the first and second output terminals of the input section via a circuit path that is exclusive of the configuration switch.

20. The switchable power converter as claimed in claim 16 wherein, for the low level input AC voltages the configuration switch switches the switchable converter section into the boost converter topology, and for high level input AC voltages the configuration switch switches the switchable converter section into the SEPIC converter topology.

21. The switchable power converter as claimed in claim 1 wherein the coupled inductor comprises first and second magnetically coupled inductors, the configuration switch has first and second states corresponding to the SEPIC and boost converter topologies, respectively, and in either state of the configuration switch the first and second magnetically coupled inductors are each electrically connected in the switchable converter section.

22. The switchable power converter as claimed in claim 1 wherein the coupled inductor comprises first and second magnetically coupled inductors, wherein the one configuration switch has first and second states corresponding to the SEPIC and boost converter topologies, respectively, and in either state of the one configuration switch the second inductor is electrically coupled to the first and second output terminals of the input section via a circuit path that is exclusive of the one configuration switch.

23. The switchable power converter as claimed in claim 22 wherein the switchable converter section further comprises:

a capacitor, a diode, a transistor switch, and a control circuit for switching the transistor switch on and off at a high frequency.

* * * * *